Aug. 23, 1966 R. A. REED 3,268,776
DRIVER FOR PULSING INDUCTIVE LOADS
Filed Nov. 21, 1962
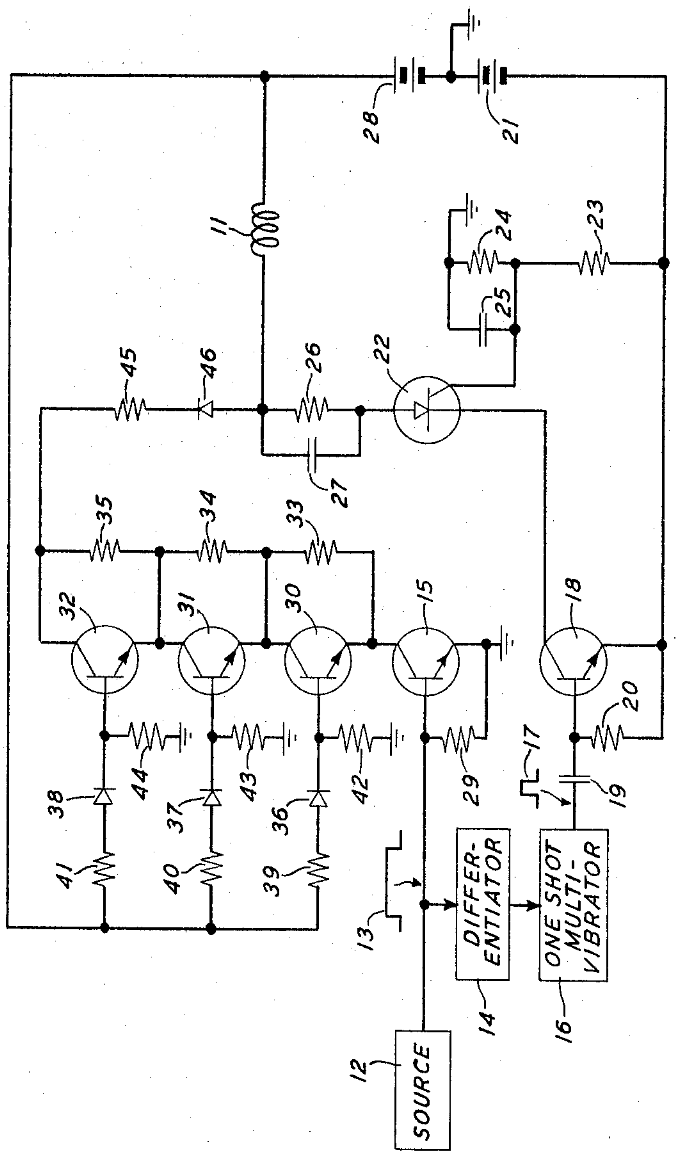
INVENTOR
R. A. REED
BY
H. L. Logan
ATTORNEY United States Patent Office 3,268,776

Patented August 23, 1966

3,268,776

DRIVER FOR PULSING INDUCTIVE LOADS

Robert A. Reed, Hackettstown, N.J., assignor to Western Electric Company, Incorporated, New York, N.Y., a corporation of New York Filed Nov. 21, 1962, Ser. No. 239,379
9 Claims. (Cl. 317—148.5)

This invention relates to circuits for controlling currents in inductors and in particular to circuits for producing rapid current changes in inductors.

There are various situations where it is desirable to produce rapid current changes in inductors. Such situations may include, for example, the control of magnetically controlled microwave devices used for switching antennas between transmitters and receivers.

As is well known in the art, the time required for a current change to be produced in a given inductor may be decreased by proportionately increasing both the resistance in series with the inductor and the voltage change applied to the series combination. This technique, however, increases the power dissipated during both the transient and the steady state conditions of the current by the same factor by which the transient time is decreased. Furthermore, it is not always practical to increase the effective series resistance because of the inductance involved.

Another technique for reducing the time required for a current change to be produced in an inductor employs what in effect amounts to a controllable resistance in series with the inductor. The controllable resistance may take the form of a vacuum tube or a transistor. In accordance with this technique, the voltage source connected across the circuit provides a voltage sufficient to produce the desired steady state current when maximum series resistance is in the circuit. In operation, the series resistance is initially lower so that the voltage applied to the inductor is greater than that applied during the steady state condition. As the inductor current increases, the controllable resistance also increases thereby providing a greater voltage drop. Because the voltage initially applied to the inductor is higher than that necessary to maintain the steady state current, the current during the transient state increases at a faster rate and the time required to reach the steady state condiion is reduced. It will be noted, however, that this technique also increases the power dissipated during the steady state condition because of losses in the controllable resistance.

An object of the present invention is to rapidly change a current through an inductive load from one level to another level with a minimum of power dissipation during both the transient and steady state conditions.

The present invention takes advantage of the previously discussed fact that the time required to produce a steady state current in an inductor may be reduced by initially applying a voltage greater than that required to maintain the steady state current. Unlike the previously described techniques, the present invention accomplishes this in a manner which does not require a resistance to be used during the steady state condition in order to provide a voltage drop, thus permitting the above-stated and other objects to be achieved.

In one of its broader aspects the present invention comprises a first normally disabled transmission path which, when enabled, applies the initial voltage to the inductor and a second normally disabled path which, when enabled, provides a relatively low impedance path that applies the steady state voltage to the inductor when the current through the inductor is at approximately the desired value. Each of these paths has input circuitry which is connected to a common input source so that an enabling signal is applied to both paths at about the same time. When an enabling signal is applied, the first path supplies current to the inductor. The second path is initially prevented from conducting because of the voltage applied to the inductor by the first path. As the inductor current increases, the voltage applied by the first path decreases until a level is reached at which time the second path begins to conduct. The inductor current at this time is very close to the desired value. Shortly after the second path begins to conduct, the first path is disabled. A relatively smooth transfer between a high voltage path and a low voltage path is thereby effected. At the termination of the enabling signal, the second path is disabled and provides a relatively high resistance that rapidly dissipates the energy in the inductor.

In one embodiment of the invention, the first path includes a normally disabled gate comprising a silicon controlled rectifier and a transistor connected in the cathode path of the rectifier. This combination provides a relatively low impedance path when conducting. The rectifier permits a voltage to be used (about 300 volts at the present state of the art) which in many applications provides a short transient time. In accordance with a feature of the invention, the transistor is used both to enable and disable the rectifier. The transistor, when enabled, causes the gate-to-cathode path of the rectifier to be forward biased so that the rectifier is enabled. As appreciated by those skilled in the art, a silicon controlled rectifier cannot be disabled by reverse biasing its gate-to-cathode path. To be disabled, its anode-to-cathode current must be reduced below a critical level. In accordance with this feature of the invention, when the enabling signal applied to the transistor is removed, the transistor reverts to a high impedance state which reduces the anode-to-cathode current below its critical level, thus causing the rectifier to become disabled.

The second path in the above-mentioned embodiment includes a normally disabled gate comprising a plurality of transistors having their collector-to-emitter paths in series connection. These transistors, when enabled and conducting, provide a low impedance circuit for the steady state voltage. When the input signal to these transistors is removed the transistors attempt to turn off. The energy stored in the inductor, however, produces a voltage which at least equals the breakdown voltage of the transistors. Although the input signal has been removed, this voltage causes a non-destructive collector-to-emitter current to continue to flow through the transistors. The transistors at this time, however, have relatively high internal resistances which dissipate the energy stored in the inductor. As mentioned previously, the time required for a current change in an inductor may be reduced by increasing the resistance in series with the inductor. In accordance with a feature of the present invention, the time required to dissipate the inductor energy is inversely related to the number of transistors connected in series. The number of transistors should not be so great, however, that a time constant is produced which causes voltages to be produced by the discharging inductor which destroy other components in the circuit.

Other objects and features of the invention will be apparent from a study of the following detailed description of the specific embodiment shown in the drawing.

In the drawing, inductor 11 is the inductor whose current is controlled. The inductor may, for example, form a part of a magnetically controlled microwave device. A source 12 provides a control pulse 13 having a duration substantially equal to the interval that inductor 11 is to be energized. Control pulse 13 is applied to a differentiating circuit 14 which forms part of an input circuit for a path for providing the initial energy for inductor 11.

Control pulse 13 is also applied to the base electrode of an NPN transistor 15 which forms part of an input circuit for a path for providing steady state energy to inductor 11.

The output of differentiating circuit 14 is applied to a one-shot multivibrator 16 which produces, in response to each input signal from differentiator circuit 14, a pulse 17. For reasons which will soon become apparent, the duration of pulse 17 is greater than the transient time of the increasing current in inductor 11 but less than pulse 13.

Pulse 17 is capacitively coupled to the base electrode of an NPN transistor 18 by a capacitor 19. Transistor 18 has a biasing resistor 20 connected between its base and emitter electrodes and is normally nonconducting. The emitter electrode of transistor 18 is connected to the negative terminal of a source 21. The positive terminal of source 21 is connected to a point of ground potential. The collector electrode of transistor 18 is connected to the cathode electrode of a silicon controlled rectifier 22.

A silicon controlled rectifier has characteristics which are similar to those of an ordinary gas thyratron. The forward drop in a silicon controlled rectifier is, however, about one-tenth that of a thyratron while its turn-on time is less by orders of magnitude. As in a thyratron, a silicon controlled rectifier continues to conduct after a gate signal has been removed. This latter characteristic necessitates the use of auxiliary circuitry to turn off the rectifier. This circuitry in the present embodiment is discussed subsequently.

The reason for using a silicon controlled rectifier in the present embodiment is that present day rectifiers have a peak forward blocking voltage in the order of 350 volts. This safely permits the use of up to 300 volts in order to obtain a relatively short transient time. It should be noted at this point, however, that it is possible to use a transistor switch arrangement in place of rectifier 22. The advantages in using a single silicon controlled rectifier instead of a multiple transistor switch arrangement are believed to be obvious to those skilled in the art.

The gate electrode of rectifier 22 is connected to the negative terminal of source 21 by way of a resistor 23. The gate electrode of rectifier 22 is also connected to a point of ground potential by way of a parallel combination comprising a resistor 24 and a capacitor 25. Resistors 23 and 24 apply a bias potential to the gate electrode of rectifier 22 so that when transistor 18 is enabled, the gate-to-cathode path of rectifier 22 is forward biased to enable rectifier 22.

One terminal of a parallel combination comprising a resistor 26 and a capacitor 27 is connected to the anode electrode of rectifier 22 while its other terminal is connected to one terminal of inductor 11. The other terminal of inductor 11 is connected to the positive terminal of a source 28 whose negative terminal is connected to a point of ground potential. As will be discussed in greater detail subsequently, the values of resistor 26 and capacitor 27 are chosen so that the impedance of the current path through rectifier 22 becomes relatively large when the transient current approaches the desired steady state value, at which time the inductor current begins to smoothly transfer to the steady state path.

Referring now to the steady state path, a biasing resistor 29 is connected between the base and emitter electrodes of transistor 15. The emitter electrode of transistor 15 is connected to a point of ground potential. The emitter electrode of an NPN transistor 30 is connected to the collector electrode of transistor 15 while the emitter electrode of an NPN transistor 31 is connected to the collector electrode of transistor 30. The emitter electrode of still another NPN transistor 32 is connected to the collector electrode of transistor 31. Connected between the base and the emitter electrode of transistors 30, 31 and 32 are resistors 33, 34 and 35, respectively. Three diodes 36, 37 and 38 have their cathode electrodes connected to the base electrodes of transistors 30, 31 and 32, respectively, while the anode electrodes of these diodes are connected to resistors 39, 40 and 41, respectively. The remaining terminals of resistors 39, 40 and 41 are connected to the positive terminal of source 28. Three resistors 44, 45 and 46 are connected between the base electrodes of transistors 30, 31 and 32, respectively, and points of ground potential. The collector electrode of transistor 32 is connected to one terminal of a current limiting resistor 45 whose other terminal is connected to the cathode electrode of an isolating diode 46. The other electrode of diode 46 is connected to the same terminal of inductor 11 as is the parallel combination of resistor 26 and capacitor 27.

Resistors 33, 34, 35 and 39 through 44 form part of the biasing circuitry for transistors 30, 31 and 32. Resistors 39, 40 and 41, which have relatively small values compared to those of resistors 42, 43 and 44, perform the further function of base current limiting when the transistors are conducting. Resistors 42, 43 and 44 perform the further function of providing paths for the collector-to-base leakage currents produced, during the turning off of the transistors, by the discharging of inductor 11. These resistors have values sufficient to limit these leakage currents to non-distinctive levels. Diodes 36, 37 and 38 prevent the collector-to-base leakage currents produced during the turning off of the transistors from becoming excessive by isolating the low valued resistors 39, 40 and 41 during this time.

In the absence of input pulse 13, transistor 15 is nonconducting. Because transistor 15 is nonconducting, the positive potential of source 28 appears at the collector electrode of transistor 15 via inductor 11, diode 46, resistors 45, 35, 34 and 33. The positive potential of source 28 also appears at the base electrode of transistor 30 via resistor 39 and diode 36. Since the base and emitter electrodes of transistors 30 are both at the same positive potential, transistor 30 is in a nonconducting state. For the same reasons, transistors 31 and 32 are nonconducting.

When input pulse 13 is produced, differentiating circuit 14 and one-shot multivibrator 16 respond to produce pulse 17. Pulse 17 enables transistor 18 which closes the path between the gate and cathode electrodes of rectifier 22. Because the rectifier gate-to-cathode path is now forward biased, rectifier 22 conducts. The conduction of rectifier 22 applies a voltage to inductor 11 which approaches the sum of the voltages of surces 21 and 28. At this time, a negative voltage is applied to the anode electrode of diode 46 which voltage back biases diode 46. With diode 46 back biased, the collector-to-emitter paths of transistors 15, 30, 31 and 32 are prevented from conducting heavily although the base-to-emitter paths of these transistors are forward biased sufficiently to otherwise produce such conduction.

As the current through inductor 11 increases, the voltage drop across the parallel combination of resistor 26 and capacitor 27 also increases. As this process continues, the voltage at the anode of diode 46 becomes less and less negative until it passes through zero potential and then starts to increase in a positive sense. When this happens, diode 46 becomes forward biased and the collector-to-emitter paths of transistors 15, 30, 31 and 32 begin to conduct heavily. Both paths are now conducting. During this time, however, the current is smoothly transferring from the first to the second path because of the increasing impedance of the first path. (The impedance of the first path when rectifier 22 begins to conduct is relatively low because of the uncharged nature of capacitor 27. This impedance increases as capacitor 27 accumulates a charge.)

Depending upon the driving current applied to transistor 18, this transistor may or may not remain in its saturated condition for the duration of pulse 17. When the driving current is insufficient to maintain the transistor in its saturated condition, the rise time of the inductor current is not as short as when the transistor remains in a saturated condition. This increase in rise time is produced as a result of an increasing voltage drop across the transistor. It is therefore possible when a rise time is shorter than necessary to effect a saving in circuitry by reducing the drive on transistor 18.

When transistor 18 is in an unsaturated condition so that its collector-to-emitter voltage is at least equal to its breakdown voltage at the termination of pulse 17, the transistor switches to its breakdown state at the termination of pulse 17. ("Breakdown state" as used herein refers to that state where the collector-to-emitter voltage of a transistor is sufficient to cause a non-destructive collector-to-emitter current to flow in the absence of any base-to-emitter drive.) In its breakdown state, the transistor presents a relatively large impedance in the cathode path of rectifier 22. On the other hand, when the transistor is maintained in either a saturated state or in an unsaturated state which does not cause the transistor to switch to its breakdown state at the termination of pulse 17, then the transistor turns off and presents a relatively large impedance in the cathode path of rectifier 22. In either case, the impedance presented by the transistor at the termination of pulse 17 is sufficient to limit the current through rectifier 22 to a level below its critical level, thereby causing the rectifier to become disabled. Just prior to the time this occurs, most of the inductor current is supplied by the second path so that only a small discontinuity occurs in this inductor current.

At the termination of pulse 13, transistor 15 attempts to turn off. The energy stored in inductor 11, however, causes transistor 15 to switch to its breakdown state. ("Breakdown state" is used here as defined above.) The relatively high impedance provided by transistor 15 in its breakdown state results in a voltage drop across the transistor that back biases transistor 30. Transistor 30 attempts to turn off but it also switches to its breakdown state. Transistors 31 and 32 also attempt to turn off but instead switch to their breakdown states. The increased impedance provided by transistors 15, 30, 31 and 32 in their breakdown states causes the energy stored in inductor 11 to be rapidly dissipated. The rate at which the inductor energy is dissipated is directly related to the number of serially connected transistors. The number of serially connected transistors is, however, limited because they must not cause a time constant to be produced which would cause voltages to be produced by the discharging inductor which may destroy other components in the circuit.

The described embodiment provides a turn-on rise time improvement substantially equal to $$\frac{R_s}{R_t} \ln \left(1-\frac{V_s R_t}{V_t R_s}\right)$$

wherein $R_s$ and $R_t$ are the resistances of the steady state and transient paths, respectively, while $V_s$ and $V_t$ are the steady state and transient voltages applied to the inductor, respectively. Decreases in the rise time by a factor of five have been obtained.

As discussed previously, the turn-off or fall time is a function of the number of serially connected transistors in the steady state path. A decrease in the fall time by a factor of four was obtained in the described embodiment.

Although a preferred embodiment of the invention has been described in detail, it is to be understood that other embodiments may be devised by those skilled in the art without departing from the spirit and scope of the invention.

What is claimed is:

1. A circuit for driving current through an inductive load, said circuit comprising a first voltage source, a second voltage source, a first path serially connecting said inductive load and one of said sources, said first path comprising a first normally disabled gate and means to isolate said first path from said load when the voltage across said load exceeds a predetermined level, a second path serially connecting said inductive load and said sources in an additive sense, said second path comprising a second normally disabled gate distinct from said first gate, a serially connected impedance means, and means responsive to an input signal to enable said second gate only for an interval to allow said inductive load current to reach substantially the steady state value of the inductive load current produced when only said first path is conductive, and means to apply an input signal to said first gate in said first path and to said means responsive to an input signal in said second path.

2. A circuit in accordance with claim 1 in which the impedance of said second path impedance means increases as a function of time during said interval.

3. A circuit in accordance with claim 1 in which said means to isolate said first path comprises a diode connected in series with said first gate with said diode poled for easy current flow with respect to said one of said sources.

4. A circuit in accordance with claim 3 in which the impedance of said second path impedance means increases as a function of time during said interval.

5. A circuit for driving current through an inductive load, said circuit comprising a first voltage source connected in series with said load to form a series path which has a current therethrough when an electrically conductive path is connected thereacross, a first bridging path connected across said series path where said first bridging path comprises an impedance, a normally disabled gate and a second voltage source all connected in series with said second voltage source poled in the same sense as said first voltage source, a second bridging path connected across said series path and including a serially connected normally disabled gate and means to disable said second path when the voltage across said series path exceeds a predetermined level, and means to enable said normally disabled gates where said first path gate is enabled only for an interval to allow said inductive load to reach substantially the steady state value of the inductive load current produced when only said first path is conductive.

6. A circuit in accordance with claim 5 in which said second bridging path means to disable said second path comprises a diode connected in series with said second path gate and poled for easy current flow with respect to said first voltage source.

7. A circuit in accordance with claim 5 in which said series connected impedance comprises a resistor and a capacitor connected in parallel.

8. A circuit in accordance with claim 6 in which said series connected impedance comprises a resistor and a capacitor connected in parallel.

9. A circuit for driving current through an inductive load, said circuit comprising a first voltage source, a second voltage source, a first normally disabled path serially connecting said inductive load and said sources in an additive sense, said first path comprising a silicon controlled rectifier, a first transistor, means connecting the collector electrode of said first transistor to the cathode electrode of said rectifier, a first resistor connected between the emitter electrode of said first transistor and the gate electrode of said rectifier, a second resistor, a first capacitor, means connecting said second resistor and said first capacitor in parallel between said rectifier gate electrode and a point of reference potential, a third resistor, a second capacitor and means connecting said third resistor and said second capacitor in parallel with respect to one another with one terminal of the parallel combination connected to said rectifier anode electrode, said emitter electrode of said first transistor and said anode electrode of said rectifier comprising the transmission terminals of said first path and the base electrode of said first transistor comprising the enabling terminal of said first path, and a second normally disabled path serially connecting said inductive load and one of said sources, said second path comprising at least a second transistor, a diode and means connecting one electrode of said diode to the collector electrode of said second transistor, the remaining electrode of said diode and the emitter electrode of said second transistor comprising the transmission terminals of said second path, the base electrode of said second transistor comprising the enabling terminal of said second path and said diode poled to isolate said second path when the voltage across said load exceeds a predetermined level.

References Cited by the Examiner

UNITED STATES PATENTS

| | | | |
|---|---|---|---|
| 3,021,454 | 2/1962 | Pickens ---------- | 317—148.5 |
| 3,133,204 | 5/1964 | Winchel ---------- | 317—148.5 |
| 3,143,668 | 8/1964 | Bloodworth et al. ---- | 307—88.5 |
| 3,205,412 | 9/1965 | Winston ---------- | 317—148.5 |

MILTON O. HIRSHFIELD, *Primary Examiner.*

SAMUEL BERNSTEIN, *Examiner.*

L. T. HIX, *Assistant Examiner.*